Sept. 9, 1958   D. G. SLOVIN   2,851,043
APPARATUS FOR WASHING RUBBER THREADS
Filed May 24, 1954   2 Sheets-Sheet 2
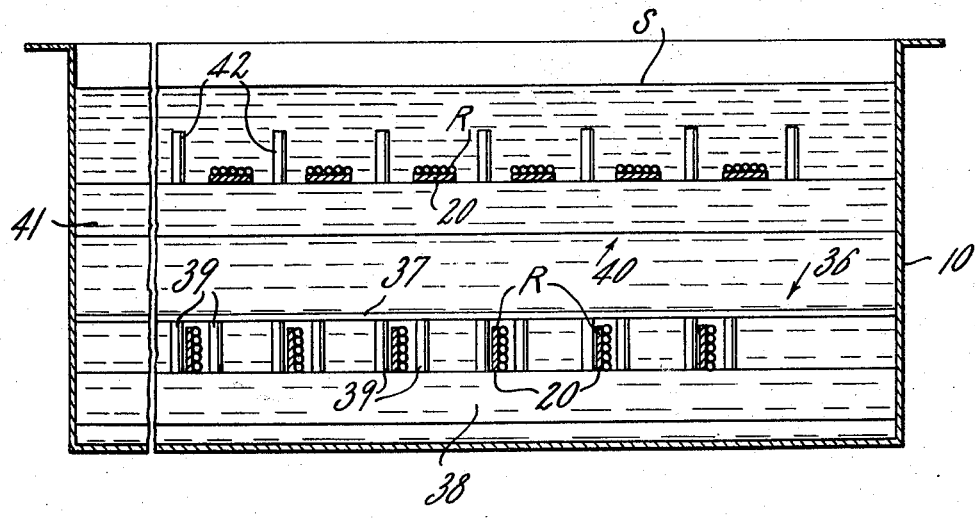
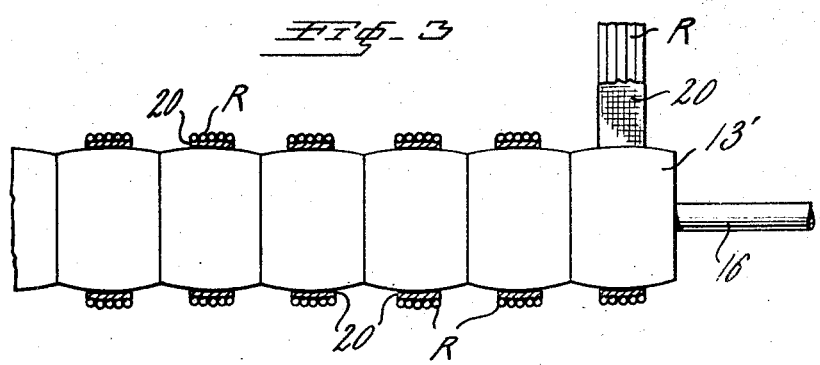
INVENTOR.
DAVID G. SLOVIN
BY
ATTORNEY 2,851,043
Patented Sept. 9, 1958

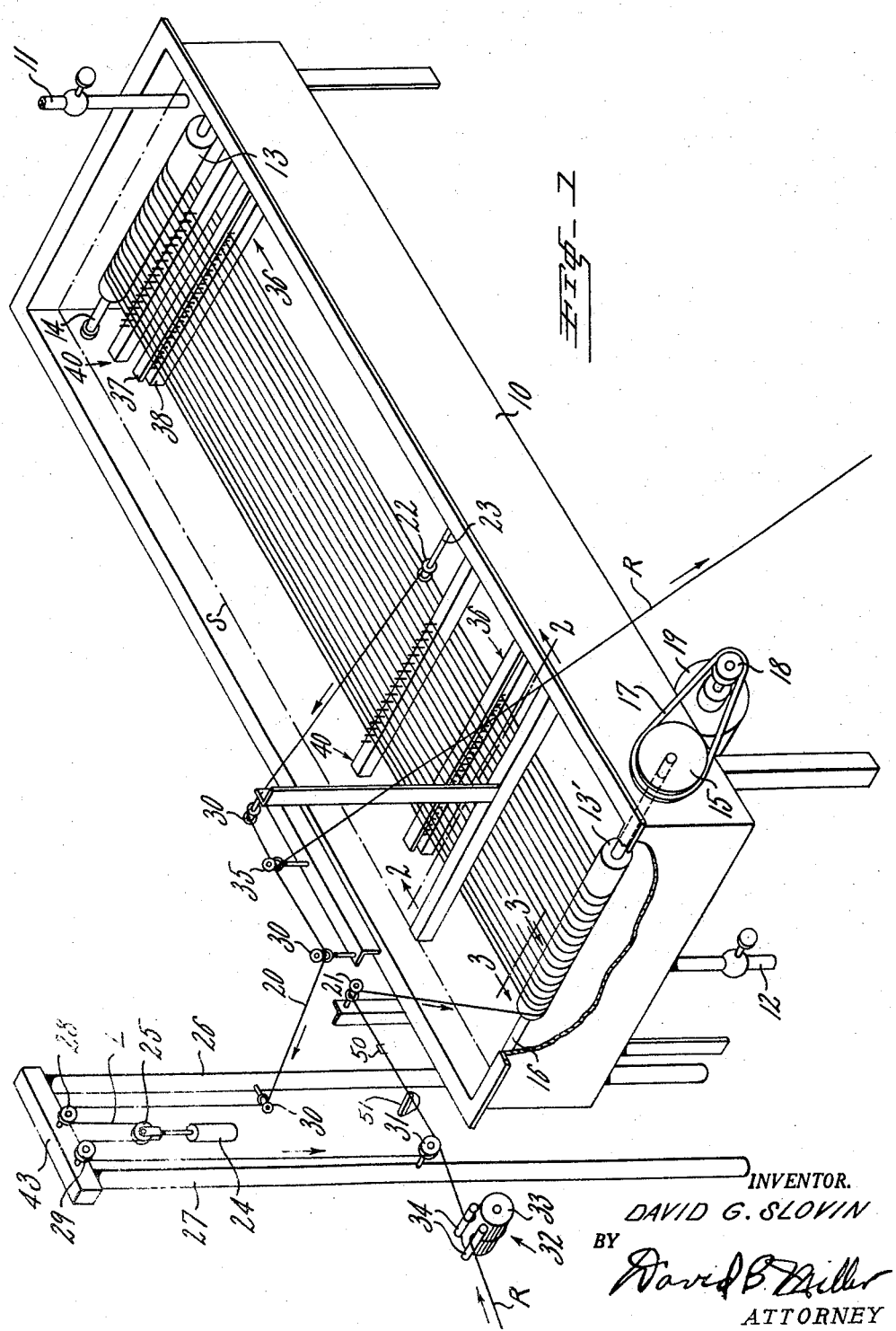

2,851,043
APPARATUS FOR WASHING RUBBER THREADS

David G. Slovin, Providence, R. I., assignor to United States Rubber Company, New York, N. Y., a corporation of New Jersey Application May 24, 1954, Serial No. 431,681

4 Claims. (Cl. 134—63)

This invention relates to an apparatus for washing bare rubber threads.

Rubber threads for various uses are supplied to manufacturers, such as textile producers, in the form of a ribbon to facilitate handling and shipping of the rubber threads. In these ribbons, the individual threads are adhered lightly to each other to hold the threads together during storage and shipment, yet the ribbon may be split into its component threads at the time when the individual threads are to be used. Such ribbons of rubber threads may be formed of cut rubber threads slightly bonded together as disclosed in the Hazell Patent 2,323,132, or the ribbon may be formed of extruded latex threads slightly adhered together as disclosed in the Slovin application, Serial No. 235,541, filed July 6, 1951, Patent No. 2,678,676 dated May 18, 1954, for Apparatus for Forming Ribbon Composed of Extruded Rubber Threads. The ribbon may also be otherwise formed.

The rubber threads, as they are produced by the thread manufacturer, may contain substances that create manufacturing problems for their users. For example, the rubber threads contain water soluble salts which will absorb water from the air, and if these salts are not removed from the threads before they are used in machinery, such as a braiding machine, the salts will absorb water from the air and deposit this moisture on the machinery to cause rusting thereof. Accordingly, it is desirable that the rubber threads be washed after they are formed to remove these substances.

The present invention contemplates a novel apparatus for continuously washing rubber threads. In accordance with this invention the rubber threads are washed in a ribbon form of the type described above. When washing rubber threads that are in such a form, it is necessary to handle the ribbon gently to prevent the individual threads from being split out of the ribbon during the washing operation.

The instant invention contemplates an apparatus suitable for washing rubber threads while in a ribbon form continuously and efficiently. In accordance with this invention, a tank is provided which is adapted to contain a washing liquid such as hot water. At each end within this tank a cylindrical roller is mounted to lie beneath the surface of the washing liquid. A flexible, substantially inextensible tape of cloth or the like extends between these rollers in a series of passes to lie along a path of great length through the liquid. This tape passes about a first of these rollers, thence extends the length of the tank to the second roller, is turned about the second roller, and extends the length of the tank back to the first roller. It next passes about the first roller at a position spaced a little distance from the first wrap of the tape thereabout. In this manner the tape extends back and forth between the rollers in several passes to lie along a path of great length through the liquid, there being no twists in the tape along its path.

Means are provided to advance the tape along this path; for example, one of the rollers may be rotatably driven to advance the tape. Means are provided externally of the liquid bath about which the tape is led to remove it from the bath. Means are also provided externally of the bath to direct the tape into the bath to be advanced along the aforedescribed path through the bath. Preferably the tape is made endless, so that as the tape is advanced along its path through the liquid, the tape may be introduced to the liquid and removed therefrom continuously without requiring a tape of undue length. By using an endless tape the necessity of continually rethreading the tape through the bath manually is avoided.

In accordance with this invention, rubber threads to be washed are disposed in the above-described ribbon form. This ribbon is disposed adjacent the tape externally of the bath, and means are provided for advancing the ribbon into and through the bath with the tape. For example, to wash a ribbon of great length, the customary form in which these ribbons are manufactured, one end of the ribbon may be stapled to the tape adjacent the means for directing the tape into the bath. To prevent fraying at the beginning of the ribbon, the ribbon end may be enclosed in a small pocket of cloth or gummed tape which in turn is stapled to the tape. The tape is then advanced through the bath until the leading end of the ribbon reaches the means externally of the bath about which the tape is led to remove it from the bath. The leading end of the ribbon is then removed from the tape and directed to suitable take-up means. After the ribbon has been threaded through the washing apparatus in this manner, the tape is then advanced continuously to advance the ribbon into, through and out of the washing liquid continuously until the entire length of ribbon has been washed.

Means are provided for holding the ribbon adjacent the tape during the washing cycle. In one practical embodiment, the ribbon is conducted to one of the rollers to be positioned between the tape and the roller at each succeeding wrap of the tape about the roller. The ribbon is thereby held by the tape and is pulled along with the tape as the latter advances about this roller and through the bath. This avoids undue tension being generated on the ribbon were it being pulled through its entire path through the bath by means only of the point at which the ribbon is stapled to the tape.

Between the rollers, means are provided to hold the ribbon generally adjacent the tape. In one embodiment these means comprise rakes along both the upper and lower runs of the tape between the rolls. These rakes extend across the bath, and they are provided with means which confine the tape and ribbon in each pass between the rollers to a generally predetermined path between the rollers, so that the ribbon is confined generally to the path defined by the tape through the washing liquid. In this manner, the tape and ribbon move along a predetermined path through the washing liquid, so that the ribbon does not become fouled as it passes through the washing apparatus of this invention.

For a better understanding of the nature of this invention, reference should be had to the following detailed description when read in conjunction with the accompanying drawings, wherein:

Fig. 1 is a perspective view of washing apparatus in accordance with this invention;

Fig. 2 is a sectional view through the washing tank of Fig. 1 along the line 2—2 of Fig. 1; and Fig. 3 is an elevational view of a portion of one of the rollers of the apparatus shown in Fig. 1 along the line 3—3 of Fig. 1.

Referring now to the drawings, there is shown an apparatus for washing rubber threads in accordance with this invention. This apparatus comprises an elongated washing tank 10 adapted to contain a washing liquid such as hot water. A pipe 11 may be provided at one end of the tank 10 for introducing the water to the tank, and a drain pipe 12 may be provided at the other end of the tank 10, to provide a continuous flow of water through the tank in an obvious manner. Within the tank 10 at the rear thereof there is rotatably mounted an idler roller 13 on a shaft 14. At the front of the tank there is mounted on a shaft 16 a rotatable driven roller 13'. Roller 13' is driven through a pulley 15, fixed to shaft 16, and a belt 17 that trains on a pulley 18 on the output shaft of a motor 19. The rollers 13, 13' are mounted beneath the surface level S of the washing liquid in tank 10.

A flexible, substantially inextensible tape 20 of cloth is mounted on the rollers 13, 13' in a series of passes to lie along an elongated path through the washing liquid. In the embodiment shown, this tape 20 passes about an idler roller 21 that is positioned externally of the bath at the front of tank 10. From roller 21, tape 20 advances downwardly into the bath in front of roller 13', thence under roller 13' to extend rearwardly of the tank toward the rear roller 13 in a generally horizontal plane. The tape 20 traverses the length of the bath and is turned about the rear roller 13 to be directed back to the front roller 13'. The tape 20 is then turned about the front roller 13' in a wrap that is spaced a little distance longitudinally of the roll from the preceding wrap of the tape. In this manner the tape extends back and forth between the rollers 13, 13' in several passes to provide an elongated path through the washing liquid that is many times longer than the tank 10.

A rotatable idler pulley 22 is mounted in the bath on a rod 23. As the tap 20 leaves roller 13' in its final pass thereabout, it is directed to idler pulley 22 and then upwardly to idler pulley 30 to remove the tape from the bath. Tape 20 is made endless by fastening its ends to each other, so that this tape may be led from idler 22 to idler 21 to be redirected into the washing tank. Preferably means are provided intermediate idlers 22 and 21 for adjustably tensioning the tape 20, so that the operation of the apparatus will not be affected by any shrinkage or stretching of the tape 20 which may occur in the use thereof.

In the embodiment shown, this means comprises a weight 24 suspended on an idler pulley 25 which hangs in a loop L of the tape 20. Two posts 26, 27 at one side of the tank carry at their upper ends on bar 43 idlers 28 and 29 between which loop L is formed. From idler 22, the tape is directed to idlers 28 and 29 in an obvious manner by passing over a series of directing idlers 30. The tape then passes downwardly between idlers 28 and 29 in a loop L in which the pulley 25 and weight 24 are suspended. From the idler 29, the tape 20 passes downwardly to an idler pulley 31 near the base of post 27. The tape is passed about idler 31 to advance to idler 21 to be directed into the washing bath.

Rubber threads which are to be washed are advanced to idler pulley 31 in a ribbon form R of the type described above from a source (not shown) through a tensioner indicated generally at 32. This tensioner comprises a rotatable driven drum 33 and a pair of idler rollers 34 that are adapted to hold the ribbon looped about the drum 33 in non-slipping relation to the drum. Preferably the drum 33 is driven at a speed which will maintain a constant differential between the speed of ribbon advance and the speed of tape advance of approximately 10%, so that the ribbon is held tensioned as it passes through the washing unit.

To wash rubber threads utilizing the apparatus of this invention, washing liquid, such as hot water, is admitted to the tank to a depth sufficient to immerse the rollers 13, 13' completely in the water. A ribbon of rubber threads R is then led through the tensioner 32 to the idler 31 near the base of post 27. The leading edge of this ribbon is stapled to the tape 20 on the underside thereof. For example, a staple, illustrated schematically at 50, which fixes the ribbon R to the tape 20, is applied from a stapling machine, shown schematically at 51, to ribbon R and tape 20. Thereafter motor 19 is actuated to rotate roller 13' to advance the tape 20 by means of the frictional engagement between the tape and the roller 13' in a direction to advance the leading edge of the ribbon R toward the roller 21. The motor 19 is operated to advance the tape 20 until the leading edge of the ribbon R has advanced through the path in the series of passes defined by the tape 20 and leaves the bath over pulley 22 to advance to an idler pulley 35. At this point the machine is stopped temporarily and the staple is removed from the ribbon R. The ribbon is then directed as indicated by the arrow in Fig. 1 to a takeup means. After the apparatus is threaded up in this manner, the motor 19 is again started, and as the tape 20 advances the ribbon R is pulled through the washing tank to be washed. The operation is continued until the entire ribbon has been washed.

During the washing operation the ribbon R is held adjacent the tape 20 so that it may be advanced through the washing bath therewith. Referring to Fig. 3 of the drawing, there is shown the construction used in the rollers 13, 13' to maintain the tape 20 along its predetermined path as well as the manner in which the apparatus is threaded up to advance the ribbon R through the bath with the tape. It will be seen that the rollers 13, 13' have crowned surfaces. These crowns are slightly wider than the width of the tape 20; for example, when a one inch tape is used the crowns may be made one and one-quarter inches wide. The crowned roller construction shown in this figure, together with the rakes about to be described, assist in maintaining the several wraps of the tape 20 along the rollers 13, 13' fixedly spaced from each other to prevent fouling of the apparatus. As will be evident from this Fig. 3, the tape 20 is led about this roller 13' between the ribbon R and the roller 13'. Therefore, since the tape 20 is adjacent roller 13', the tape will be pulled through the washing bath as the roller 13' rotates.

There are mounted within the tank 10 and between the rollers 13, 13' a plurality of rakes 36 in the lower run of the tape between the rollers 13, 13'. Referring to Fig. 2, it will be seen that the rakes 36 are formed by a horizontal plate 37 and a spaced angle iron 38, and have teeth 39 in pairs extending therebetween. These teeth or pins 39 and the plate 37 and angle iron 38 define a passageway through which the tape 20 and ribbon R may pass as they traverse the tank from roller 13' to roller 13. There is disposed in the upper run of the tape 20 rakes 40 which also serve to guide the ribbon R and tape 20. As shown in Fig. 2 the rakes 40 for the upper run are of a somewhat modified construction. These rakes 40 consist of an angle iron 41 from which upstand teeth 42. The angle iron 41 and adjacent teeth 42 define a restricted passageway through which the ribbon R and tape 20 may pass between the roller 13 and the roller 13'.

It will be apparent that in washing a rubber ribbon R of the type specified, it is desirable that the ribbon R be maintained out of frictional engagement with any object which would tend to restrict the free passage of the ribbon R along its path. In one embodiment of this invention this is achieved by arranging the rakes 36 and 40 in such a manner that the apparatus may be threaded up with the tape 40 in frictional engagement with the rakes while the ribbon R is generally free but adjacent the tape 20. In threading up the apparatus shown, the tape 20 may be led about the roller 13' between the ribbon R and the roller 13'. As the tape and ribbon leave the roller 13', they are turned 90° counterclockwise as seen in Fig. 2 so that the tape 20 will bear against the left pin of the pair of pins 39 of rake 36, and the ribbon R passes freely between the pins 39 as illustrated in Fig. 2 as it reaches the first rake in the lower pass through the tank. The tape 20 and ribbon R are held in this position until they pass the final rake 36 in the lower pass.

As the tape and ribbon leave the final lower rake 36, they are turned 90° counter-clockwise looking in the direction of Fig. 2, so that as the ribbon R and tape 20 pass about roller 13 the ribbon R is firmly confined between the tape 20 and the roller 13 to be pulled along with the tape 20. As the ribbon and tape leave the roller 13 in the upper run, they are turned 180° counter-clockwise as seen in the upper run of Fig. 2 to dispose the tape 20 between the ribbon R and the angle iron 41 of rake 40. In this manner the tape 20 is maintained between the ribbon R and the fixed angle irons 41 of the rake 40. The tape and ribbon are then conducted again to roller 13' in this condition so that the tape 20 is adjacent roller 13' in firm driving frictional engagement therewith. In this manner it will be seen that the ribbon R is confined and affixed to the tape 20 in firm driving engagement at the rear roller 13, and is confined generally adjacent this tape 20 by means of the rakes 36 and 40 as well as the driving roller 13'. Yet the ribbon R throughout most of its traverse of the washing bath may flow free of the tape 20, and the tape 20 is maintained disposed between the delicate stretchable ribbon R and any stationary parts of the apparatus. In this manner it will be seen that the ribbon R is washed efficiently, yet during this washing operation it is handled delicately so that there is little or no tendency to split the individual threads from the ribbon.

The length of the tank 10 as well as the number of passes of the tape 20 between the rollers 13, 13' may be varied to suit the operating speeds permissible to give thorough washing of the threads. In general it is found desirable to maintain the ribbon in the washing bath for periods of time up to one-half an hour to give a thorough washing of the threads. Thus the tape 20 may be disposed on suitably spaced rollers in a suitable number of wraps to give a total washing path of 3,000 feet. Such a washing path will permit a 30 minute wash of the ribbon when the ribbon is advancing at a rate of 100 feet per minute.

Having thus described my invention, what I claim and desire to protect by Letters Patent is:

1. Apparatus for washing a ribbon formed of bare rubber threads adhered to each other, which comprises a tank of holding liquid, a pair of spaced rollers in said tank for supporting the ribbon beneath the surface of the liquid, a substantially inextensible tape on said rollers and extending therebetween in a series of passes spaced longitudinally of said rollers to lie along an elongated path through said liquid, means for introducing a ribbon of bare rubber threads adhered to each other into said liquid adjacent said tape, means fixing said ribbon to said tape to be advanced therewith, means for advancing said tape and said ribbon continuously along said path through the liquid, and a rake arranged in said tank to be immersed in the liquid intermediate said rollers defining individual passageways therethrough for the several passes of said tape and ribbon.

2. Apparatus for washing a ribbon formed of bare rubber threads adhered to each other, which comprises a tank for holding a liquid, a pair of spaced cylindrical rollers in said tank for supporting a ribbon beneath the surface of the liquid, a substantially inextensible tape on said rollers extending therebetween in a series of passes and about said rollers at spaced apart points along their length, rakes arranged in said tank to be immersed in the liquid defining passageways therethrough for the several passes of the tape and adapted to confine the tape and a ribbon adjacent each other as they pass between said rollers, means fixing said ribbon to said tape at one area only of said tape to be advanced therewith, means for advancing said tape through the liquid, means for introducing the tape and a rubber ribbon to the liquid, and means for removing the washed ribbon from the liquid.

3. Apparatus for washing a ribbon formed of bare rubber threads adhered to each other, which comprises a tank for holding a liquid, a pair of spaced cylindrical rollers in said tank for supporting a ribbon beneath the surface of the liquid, an endless tape on said rollers extending therebetween in a series of passes and about said rollers at spaced apart points along the length of the rollers, said tape extending in said passes from one of said rollers to and around the other and thence back to the first roller at a level to be immersed in the liquid throughout both traverses between said rollers, means for introducing a ribbon and said tape to the washing liquid adjacent each other, means fixing said ribbon to said tape to be advanced therewith throughout the path of said tape, means for advancing said tape and said ribbon through the washing liquid, and means for removing the washed ribbon from said bath.

4. Apparatus in accordance with claim 3 wherein the rollers are individually crowned at a plurality of points along their lengths, and in which the tape extends around the rollers at the crowns.

References Cited in the file of this patent

UNITED STATES PATENTS

| | | |
|---|---|---|
| 391,393 | Villeneuve | Oct. 16, 1888 |
| 535,012 | Kohlrausch | Mar. 5, 1895 |
| 740,990 | Parker | Oct. 6, 1903 |
| 1,319,085 | Jacobson | Oct. 21, 1919 |
| 1,544,506 | Tytus | June 30, 1925 |
| 1,940,749 | Gwaltney | Dec. 26, 1933 |
| 2,166,583 | Critten | July 18, 1939 |
| 2,314,369 | Reed | Mar. 23, 1943 |
| 2,505,033 | Elvin | Apr. 25, 1950 |
| 2,522,071 | Tait | Sept. 12, 1950 |
| 2,650,603 | Howes | Sept. 1, 1953 |
| 2,659,225 | Ewing | Nov. 17, 1953 |
| 2,678,676 | Slovin | May 18, 1954 |
| 2,688,333 | Lorig | Sept. 7, 1954 |

FOREIGN PATENTS

| | | |
|---|---|---|
| 7,148 | Great Britain | of 1902 |